: 
United States Patent [19]

Wolff et al.

[11] Patent Number: 5,148,017
[45] Date of Patent: Sep. 15, 1992

[54] APPARATUS FOR DETECTING CHANGES OF LENGTH IN A MEDIUM EMPLOYING DIFFERENT FIBER LENGTH

[75] Inventors: Reinhard Wolff; Hans-Joachim Miesseler, both of Cologne, Fed. Rep. of Germany

[73] Assignee: Strabab Bau-AG, Cologne, Fed. Rep. of Germany

[21] Appl. No.: 708,980

[22] Filed: May 31, 1991

[30] Foreign Application Priority Data

Jun. 12, 1990 [DE] Fed. Rep. of Germany ....... 4018740

[51] Int. Cl.$^5$ .............................................. H01J 5/16
[52] U.S. Cl. ................................... 250/227.14; 73/800
[58] Field of Search ...................... 250/227.14, 227.15, 250/227.16; 340/541, 555, 870.37, 678, 690; 73/800

[56] References Cited

U.S. PATENT DOCUMENTS 4,636,638  1/1987  Hwang et al. ................. 250/227.15
5,026,141  6/1991  Griffiths ......................... 250/227.15
5,038,618  8/1991  Malvern ............................... 73/800

FOREIGN PATENT DOCUMENTS 2920886  6/1980  Fed. Rep. of Germany .
 251198 11/1987  Fed. Rep. of Germany .
3635053  4/1988  Fed. Rep. of Germany .
3804135  8/1989  Fed. Rep. of Germany .

Primary Examiner—David C. Nelms
Assistant Examiner—T. Davenport
Attorney, Agent, or Firm—Body, Vickers & Daniels

[57] ABSTRACT

Apparatus for detecting changes of a medium along a measuring path in the medium, comprising several lightwave conductors arranged on a carrier, conveniently in a sleeve. Reflective ends of the light wave conductors are fixed at different distances along the measuring path. Type, extent, and location of longitudinal changes in the medium to be checked can be detected at any time by optical length measuring of the individual lightwave conductors by means of an optical rangefinder.

8 Claims, 1 Drawing Sheet

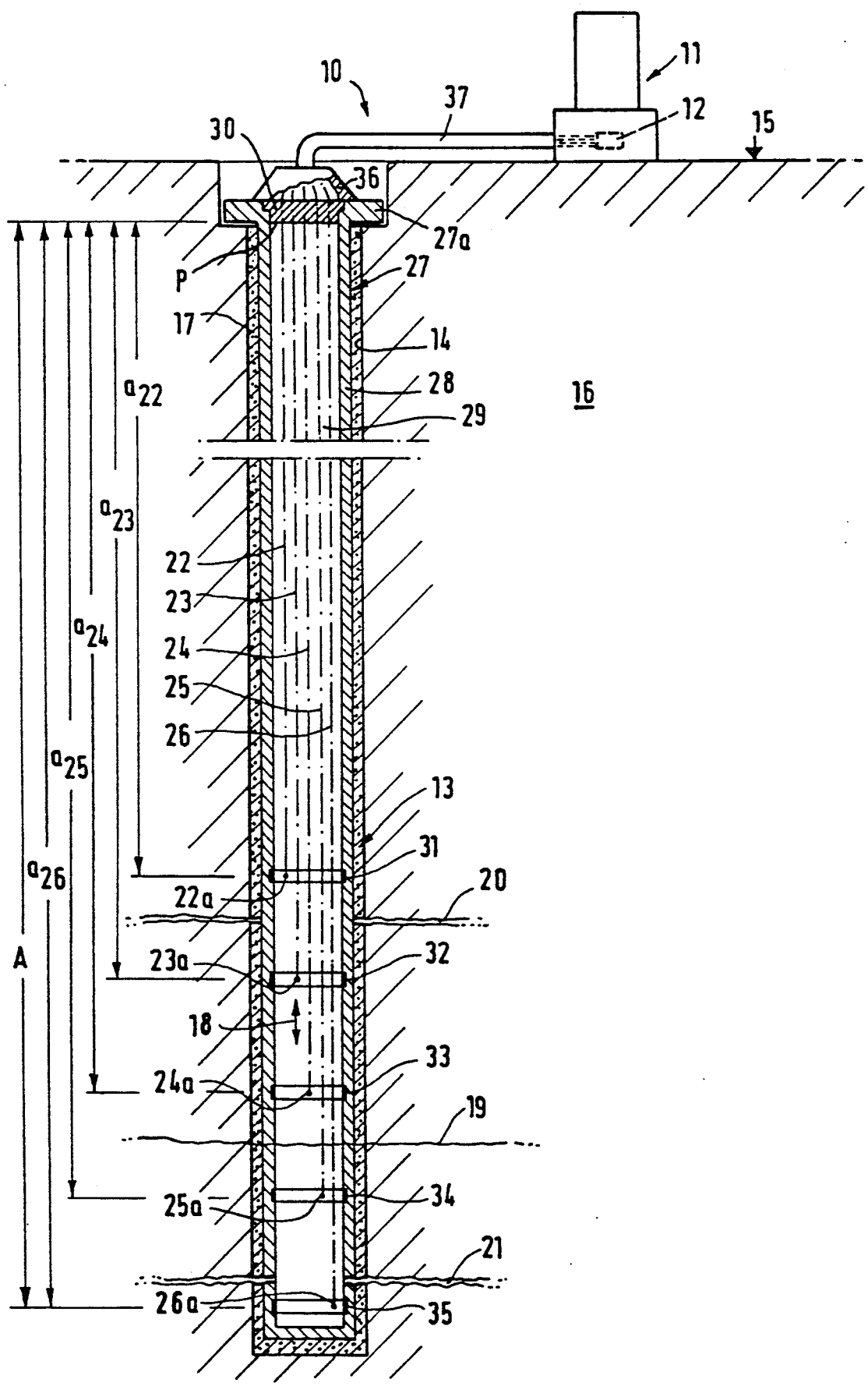

APPARATUS FOR DETECTING CHANGES OF LENGTH IN A MEDIUM EMPLOYING DIFFERENT FIBER LENGTH

The invention relates to detection of changes of a medium along a measuring path therein, in a manner utilising several measuring marks along the measuring path arranged at differing distances from a reference position.

Such apparatus, also referred to as an "extensometer", can serve in detecting ground subsidence, cracks developing in a structure or in the ground, or the detection of other movement in a structure, for example a dam, due to external forces, for example the pressure of water in a reservoir behind a dam.

In one known extensometer, a borehole in the medium to be examined has several measuring marks equally spaced relative to each other and firmly anchored in the borehole, see German Patent Specification No. 2920886. The distance between two of the measuring marks can be checked by means of a probe entered into the borehole and having two measuring heads locatable relative to two measuring marks, usually adjacent ones, the distance between which marks is determined by means of an inductive displacement gauge communicating via a cable with a digital display. Disadvantages of this known extensometer are that only one distance between two measuring marks is checked at any one time for any one physical set up of the heads, and generally that measurement range is limited by the length of the measuring probe. Measurement is thus a laborious process and can only be performed for one part of the borehole at a time.

In another known extensometer, a borehole within the medium to be examined is filled with filter gravel having measuring marks secured therein at spaced distances from each other by way of concrete injections. The measuring marks are at free ends of thin bars which are longitudinally movable in thin pipes in the filter gravel and have their other ends protruding from the borehole. Electric displacement gauges detect longitudinal displacements of the bars at their protruding ends and relay same to a display unit. It is very difficult to sink the measuring marks to great depths of the borehole and secure them thereat, as this necessitates the provision of very long concrete injection lines. Furthermore, the bars, which are guided in pipes, take up quite a lot of space across their longitudinal direction, so that the borehole required for even a relatively small number of measuring marks must have quite a large diameter.

It is an object of the invention to provide a device suitable as an extensometer relying on spaced measuring marks, not only to be capable of monitoring changes in a medium periodically or continuously, and automatically, as to size and location, but which requires comparatively little space, is of simple construction, is easily installed, and has capability to check either straight or curved measuring paths.

According to the invention, each measuring mark is a reflecting end of a lightwave conductor which is firmly fixed to a carrier member itself capable of being fixedly connected to the medium to be checked along the measuring path.

In one embodiment of the invention, the carrier member is a sleeve including therein embedded lightwave conductors, thus serving, at the same time, as a measuring pipe, a sensor, and a transmission channel for optical measuring signals that can be modulated according to changes occurring in the medium along the measuring path. Suitable lightwave conductors can be very small in diameter so that many of them can be accommodated in a sleeve of small cross-section, thus requiring only a small borehole or other channel of small diameter, whether in the ground or in a structure to be checked.

Preferably, coherent light is used for passage along each individual lightwave conductor from one reference position and reflection from its end serving as a measuring mark. Longitudinal changes of the medium that occur in the course of time, can be checked periodically or effectively continuously, and automatically, by comparing optical path length measurements with initial values measured at installation or other desired reference time.

Preferred lightbeam measurement relying on total reflection has low light losses and can check all changes, whether expansions, such as cracks, or compressive deformations, including along a curved measuring path. This is of particular advantage for curved structures, such as arcuate dams, or in going around corners.

Sensors hereof can have a large number of lightwave conductors and can be pre-fabricated in considerable lengths. Such sensors are electromagnetically neutral and insensitive to humidity, which is advantageous when used in damp structures or in the ground.

It is particularly advantageous for all the lightwave-conductors to be in a common sleeve. Such sleeve can then include a hose or a pipe with the lightwave conductors arranged therein and connected thereto along the measuring path by elastic material, but with their reflecting ends fixedly attached to the hose or pipe. The hose or pipe can even be of a brittle material which, for crevasses and cracks appearing in the medium to be checked, tears open across its longitudinal direction as pulling forces act on the pipe or hose. A part or parts of the pipe or hose that then moves or move can take with it or them the reflecting end of at least one sensor, whereupon at least the corresponding lightwave conductor embedded in the elastic mass can stretch.

In another embodiment, the hose or pipe can be of an elastic material, so that the pipe or hose expands or contracts depending on whether pulling forces or compression forces act on the pipe or hose.

A suitable pipe can be made of a fibre-reinforced material, for example glass fibers or carbon fibers embedded in synthetic plastics material. Fibre-reinforced materials of this type have a high modulus of elasticity and thus can stretch within substantial limits, but also have high rigidity. The lightwave conductors can then have their reflective ends attached to the pipe, for example glued to the inside wall of the pipe, or attached to cross-members which themselves are anchored in the wall of the encapsulating pipe or hose. The lightwave conductors are advantageously embedded along their total length in a synthetic material that is elastic and completely fills the pipe, so as to protect the lightwave conductor from being damaged, and to assist in transfer of changes along the measuring path that reflect changes transferred by the checked medium to the sleeve. The lightwave conductors then experience continuous longitudinal changes as they stretch or deform.

The sleeve can be glued to the medium to be checked along the entire length of the measuring path, for example inside a concrete component, or even at the outside of such a component. The sensor, comprised of lightwave conductors and the sleeve, can be embedded along the entire measuring path in the medium to be checked, and connected thereto, by a hardening mass, for example concreted into a component, or secured in a ground borehole by means of injected mortar which saturates the space between borehole wall and the outside circumference of the sleeve of the sensor.

Lightwave conductors of the sensor are advantageously permanently connected to an evaluation unit capable of checking the length of the lightwave conductors whenever required or arranged to do so. An alarm system can be provided to be triggered by predetermined certain measured values, for example if undue cracks or crevices develop in the medium to be checked, for example in the foundation of a building, or when the evaluation unit registers subsidence in excess of pre-determined values.

Further detailed features and advantages of embodiments of the invention are contained in the following description and the drawing, which shows an installed device schematically in side view and partially in longitudinal section.

BRIEF DESCRIPTION OF THE DRAWING

The FIGURE is a cut away view of the subject apparatus situated in a vertical borehole.

Underneath a dam (not shown) subsidence and rock movements expected in the ground 16 are to be checked and recorded, normally on a continuing basis over a long period of time. An extensometer is used relative to a measuring path provided into the ground. The extensometer by which subsidence, expansion, contraction and other displacement in the ground are to be detected, is referenced 10 overall. It comprises an evaluation unit 11, which is accommodated above ground level or in a chamber, say of a dam, and has an optical range-finding device 12 and a sensor 13 shown disposed in a borehole 14. The borehole 14 is specifically indicated as being located under sole 15 of a dam, conveniently substantially vertically into the ground 16. The sensor 13 is embedded in the borehole 14 by means of a concrete- or synthetic-material mortar or other hardened or cured mass 17, and is thus firmly connected with the borehole wall. In the ground 16, which is the medium to be checked, deformation zones that may be due to subsidence, and/or expansion zones that may be due to other displacement, and which extend transversely of the axis 18 of the borehole 14 are indicated in the drawing by an approximately horizontally extending line 19 for a deformation zone, and two pairs of horizontally extending lines 20 and 21 for expansion zones.

Sensor 13 shown in the borehole 14 comprises a plurality of lightwave conductors (LWL) of which only five 22, 23, 24, 25 and 26 are shown in the drawing. These lightwave conductors 22 to 26 are tightly encapsulated along the measuring path following the axis of the borehole 14 within a sleeve referenced 27 overall. The sleeve 27 comprises an outer pipe 28 outside an elastic mass 29 into which lightwave conductors 22 to 26 are embedded in such a manner that they are connected to and by said elastic mass 29 over their entire lengths along the measuring path A. The outer pipe 28 can be of a fibre-compound material, for example of glass-fibre reinforced synthetic plastics material. A suitable outside diameter is about 30 mm. The elastic mass 29 inside the pipe 28 can be an elastomer, preferably of synthetic plastics material, which adheres well both to the inside wall of pipe 28, and to the lightwave conductors 22 to 26. Instead of a pipe of glass-fibre material, a hose of sufficiently strong but flexible synthetic material can be used, so that the sensor is flexible and can follow curved measuring paths. It is feasible to glue the sensor to the outside of a component following any desired measuring path, or to place it inside a structure in a bent configuration, or to embed it in concrete or attach it as desired.

In the drawing, the sensor 13, has an outside diameter of approximately 30 mm. However, the diameter can be larger, and many more than just five lightwave conductors can be accommodated in the sleeve 27 of the sensor 13, which can readily have a length of up to 50meters.

The drawing shows the lightwave conductors 22 to 26 attached at the upper end 27a of sleeve pipe 28 in a sealing plate 30, but of differing lengths. The free lower ends 22a, 23a, 24a, 25a or 26a, respectively, of the lightwave conductors 22 to 26 are mirrored and secured relative to the pipe 28 of the sleeve 27. For this purpose, the mirrored ends 22a to 26a can be fixed by glue, shown using perforated cross members 31 to 35 themselves anchored to the wall of the pipe 28. The mirrored ends 22a to 26a of the lightwave conductors 22 to 26 constitute measuring marks which, for each illustrated lightwave conductor 22 to 26, have different distances $a_{22}$, $a_{23}$, $a_{24}$, $a_{25}$ and $a_{26}$ from a reference point P shown represented by the lower front face of an upper sealing plate 30, to and through which the lightwave conductors 22 to 26 are secured for exit into a hood 36. Above the sealing plate 30, the lightwave conductors are gathered in the hood 36 and can be connected conventionally to lightwave conductors of a preferably flexible lightwave-conductor cable 37 going to the evaluation unit 11.

In the evaluation unit 11, the respective conductor path lengths are measured by a lightbeam originating from a coherent light source and passing to the mirrored end in the lightwave conductor then concerned and reflected back during a corresponding measuring interval. This length can then be compared to the length recorded for a calibrating lightbeam used immediately after installation. Differences in measurements from the time of installation to the time of checking permit determination of whether changes have occurred in the interim, to what extent, whether they are expansions or contractions, and where along the overall measuring path those changes have occurred.

For example, if the ground has expanded in the region between the mirrored end 22a of lightwave conductor 22 and the mirrored end 23a of lightwave conductor 23, say as shown in the drawing by double line 20, then this will be detected by all of the lightwave conductors 23, 24, 25 and 26 having become longer by the same amount, but the length of the lightwave conductor 22 having remained unchanged. Similarly, observations can be made for other expansions, say as shown between the mirrored end 25a of the lightwave conductor 25 and the mirrored end 26a of the lightwave conductor 26, by indication of a horizontal crack 21. Then, only the lightwave conductor 26 will have increased in length.

If, however, a compression 19 has taken place in the ground, see the region between the mirrored end 24a of lightwave conductor 24 and the mirrored end 25a of lightwave conductor 25, then lightwave conductors 25 and 26 have become shorter, whilst the length of lightwave conductors 22, 23 and 24 will be unchanged.

By appropriate addition and subtraction operations, positive and negative longitudinal changes in the individual lightwave conductors will be determined, and several compressions and expansions can be detected and localised to specific measuring ranges over the measuring path as defined by the distances between the mirrored ends of respective pairs of the lightwave conductors.

It will be appreciated that expansions large enough to cause cracks in the pipe 28, even the sleeve 27, do not necessarily affect the measuring result, so long as the lightwave conductors in the sleeve 27 do not break in the expansion zone. As the lightwave conductors are of relatively great length, have some stretch capability, and are completely embedded in an elastic mass, length changes due to cracks in the checked medium tend to occur throughout the entire length of the lightwave conductors, and facilitate recording.

The evaluation unit can include a conventional optical rangefinder, which transmits light spots or pulses through the lightwave conductors for reflection by their mirrored ends and return to their points of origin. The wavelength of the light waves originating with a coherent lightsource can be varied by a modulator according to actual length to the reflecting mirrored end, effectively tuned, so that a standing wave is established between the lightsource and each particular reflecting mirror in turn. Comparison can reduce to, or at least include, the number and frequencies of modulated light pulses compared with the number and frequencies of light pulses recorded for each individual lightwave conductor immediately after installation. By using a software controlled multiplexer, all lightwave conductors of differing lengths can be connected to a single rangefinder, and it is possible to perform the measuring process under computer control and automatically.

The invention is not limited to the illustrated and described exemplary embodiment, but several modifications and additions are possible without going outside the scope of the invention. For example, the sensor could be installed in a horizontal or transverse position, and it can be adapted to curved measuring paths. Furthermore, the sensor does not have to be concreted into the medium to be checked, but it is also possible to glue it to the medium to be checked or to connect it in any other effective way.

We claim:

1. Apparatus for detecting changes of length in a medium along a measuring path through that medium, including a plurality of lightwave conductors following the measuring path each to different extent from a reference position, each such lightwave conductor having a reflecting end remote from said reference position and a lightwave conductor carrier member following said measuring path, and having said reflecting ends of the lightwave conductors secured thereto at said different distances, said carrier member being for fixed connection to said medium along the length of the measuring path.

2. Apparatus according to claim 1, wherein the carrier member comprises a sleeve about all of the lightwave conductors.

3. Apparatus according to claim 1, wherein the carrier member is of hollow pipe form and the lightwave conductors are embedded in elastic material within the carrier member, and the carrier member has internal fixed connecting means for the mirrored ends.

4. Apparatus according to claim 4, wherein the carrier member is composed of a fibre-reinforced material, and the lightwave conductors are embedded over their entire length in synthetic plastics material as said elastic material.

5. Apparatus according to claim 1, wherein the carrier member is expandable and contractible along the measuring path.

6. Apparatus according to claim 1, wherein the carrier member is glued to the medium to be checked along the entire measuring path.

7. Apparatus according to claim 1, wherein the carrier member is embedded within the medium by a hardening material extending along the entire measuring path.

8. Apparatus according to claim 1, comprising an evaluation unit which is permanently connected to the lightwave conductors and serves to check their lengths from time to time using light pulses applied thereto and reflected from their ends.

* * * * *